US006801924B1

(12) United States Patent
Green et al.

(10) Patent No.: US 6,801,924 B1
(45) Date of Patent: Oct. 5, 2004

(54) FORMATTING DENORMAL NUMBERS FOR PROCESSING IN A PIPELINED FLOATING POINT UNIT

(75) Inventors: Daniel W. Green, McKinney, TX (US); Atul Dhablania, San Jose, CA (US); Jeffrey A. Lohman, Plano, TX (US)

(73) Assignee: National Semiconductor Corporation, Santa Clara, CA (US)

( * ) Notice: Subject to any disclaimer, the term of this patent is extended or adjusted under 35 U.S.C. 154(b) by 10 days.

(21) Appl. No.: 09/377,140

(22) Filed: Aug. 19, 1999

(51) Int. Cl.[7] ................................................. G06P 7/38
(52) U.S. Cl. ....................................... 708/495; 708/204
(58) Field of Search ................................. 708/204, 495

(56) References Cited

U.S. PATENT DOCUMENTS

| | | |
|---|---|---|
| 4,949,291 A | 8/1990 | Saini |
| 5,040,138 A | 8/1991 | Maher, III |
| 5,144,570 A | 9/1992 | Maher, III |
| 5,161,117 A | 11/1992 | Waggener |
| 5,257,215 A | 10/1993 | Poon |
| 5,272,654 A | 12/1993 | Nix |
| 5,561,615 A | 10/1996 | Kuo et al. |
| 5,584,009 A | 12/1996 | Garibay, Jr. et al. |
| 5,619,198 A | 4/1997 | Blackham et al. |
| 5,633,819 A | 5/1997 | Brashears et al. |
| 5,644,741 A | 7/1997 | Bluhm et al. |
| 5,652,584 A | 7/1997 | Yoon |
| 5,835,967 A | 11/1998 | McMahan |
| 6,131,106 A | * 10/2000 | Steele, Jr. .................... 708/510 |

OTHER PUBLICATIONS

Suzuki, et al., in "Leading–Zero Anticipatory Logic for High–Speed Floating Point Addition", IEEE Journal of Solid–State Circuits, vol. 31, No. 8, Aug. 1996.

Hokenek and Montoye in "Leading–zero Anticipator (LZA) in the IBM RISC System/6000 Floating–point Execution Unit", IBM J. Res. Develop., vol. 34, No. 1, Jan. 1990.

* cited by examiner

*Primary Examiner*—Chuong Dinh Ngo

(57) ABSTRACT

A floating point unit (FPU) for processing denormal numbers in floating point notation, a method of processing such numbers in an FPU and a computer system employing the FPU or the method. In one embodiment, the FPU includes: (1) a load unit that receives a denormal number having an exponent portion of a standard length from a source without the FPU and transforms the denormal number into a normalized number having an exponent portion of an expanded length greater than the standard length, (2) a floating point execution core, coupled to the load unit, that processes the normalized number at least once to yield a processed normalized number, the expanded length of the exponent portion allowing the processed normalized number to remain normal during processing thereof and (3) a store unit, coupled to the floating point execution core, that receives the processed normalized number and transforms the processed normalized number back into a denormal number having an exponent portion of the standard length.

21 Claims, 7 Drawing Sheets a. Single Precision:

| 1 | 8 | 23 |
|---|---|---|
| s | e | f | b. Single Extended Precision:

| 1 | 11 | 32 |
|---|---|---|
| s | e | f | c. Double Precision

| 1 | 11 | 52 |
|---|---|---|
| s | e | f | d. Double Extended Precision

| 1 | 15 | 64 |
|---|---|---|
| s | e | f |

IEEE Standard Floating Point Formats
   s = sign
   e = exponent
   f = binary digit fraction (mantissa)

Internal Floating Point Format
   s = sign
   e = exponent
   f = binary digit fraction (mantissa)

| 1 | 17 | 70 | 5 |
|---|----|----|---|
| s | e  | f  | Tag |

FORMATTING DENORMAL NUMBERS FOR PROCESSING IN A PIPELINED FLOATING POINT UNIT

CROSS-REFERENCES TO RELATED APPLICATIONS

This patent application is related to commonly assigned and contemporaneously filed U.S. patent application Ser. Nos. 09/377,683 now U.S. Pat. No. 6,490,606 entitled "ROUNDING DENORMALIZED NUMBERS IN A PIPELINED FLOATING POINT UNIT WITHOUT PIPELINE STALLS"; 09/377,099 now U.S. Pat. No. 6,415,308 entitled "CONVERTING NEGATIVE FLOATING POINT NUMBER TO INTEGER NOTATION WITHOUT TWO'S COMPLEMENT HARDWARE"; 09/377,136 now U.S. Pat. No. 6,523,050 entitled "INTEGER TO FLOATING POINT CONVERSION USING ONE'S COMPLEMENT WITH SUBSEQUENT CORRECTION TO ELIMINATE TWO'S COMPLEMENT IN CRITICAL PATH"; and 09/377,139 now U.S. Pat. No. 6,405,232 entitled "LEADING BIT PREDICTION WITH IN-PARALLEL CORRECTION", all of which are herein incorporated by reference.

TECHNICAL FIELD OF THE INVENTION

The present invention is directed, in general, to microprocessors and, more particularly, to a processor architecture employing an improved floating point unit (FPU).

BACKGROUND OF THE INVENTION

The ever-growing requirement for high performance computers demands that computer hardware architectures maximize software performance. Conventional computer architectures are made up of three primary components: (1) a processor, (2) a system memory and (3) one or more input/output devices. The processor controls the system memory and the input/output ("I/O") devices. The system memory stores not only data, but also instructions that the processor is capable of retrieving and executing to cause the computer to perform one or more desired processes or functions. The I/O devices are operative to interact with a user through a graphical user interface ("GUI") (such as provided by Microsoft Windows™ or IBM OS/2™), a network portal device, a printer, a mouse or other conventional device for facilitating interaction between the user and the computer.

Over the years, the quest for ever-increasing processing speeds has followed different directions. One approach to improve computer performance is to increase the rate of the clock that drives the processor. As the clock rate increases, however, the processor's power consumption and temperature also increase. Increased power consumption is expensive and high circuit temperatures may damage the processor. Further, the processor clock rate may not increase beyond a threshold physical speed at which signals may traverse the processor. Simply stated, there is a practical maximum to the clock rate that is acceptable to conventional processors.

An alternate approach to improve computer performance is to increase the number of instructions executed per clock cycle by the processor ("processor throughput"). One technique for increasing processor throughput is pipelining, which calls for the processor to be divided into separate processing stages (collectively termed a "pipeline"). Instructions are processed in an "assembly line" fashion in the processing stages. Each processing stage is optimized to perform a particular processing function, thereby causing the processor as a whole to become faster. "Superpipelining" extends the pipelining concept further by allowing the simultaneous processing of multiple instructions in the pipeline. Consider, as an example, a processor in which each instruction executes in six stages, each stage requiring a single clock cycle to perform its function. Six separate instructions can therefore be processed concurrently in the pipeline; i.e., the processing of one instruction is completed during each clock cycle. The instruction throughput of an n-stage pipelined architecture is therefore, in theory, n times greater than the throughput of a non-pipelined architecture capable of completing only one instruction every n clock cycles.

Another technique for increasing overall processor speed is "superscalar" processing. Superscalar processing calls for multiple instructions to be processed per clock cycle. Assuming that instructions are independent of one another (the execution of each instruction does not depend upon the execution of any other instruction), processor throughput is increased in proportion to the number of instructions processed per clock cycle ("degree of scalability"). If, for example, a particular processor architecture is superscalar to degree three (i.e., three instructions are processed during each clock cycle), the instruction throughput of the processor is theoretically tripled.

These techniques are not mutually exclusive; processors may be both superpipelined and superscalar. However, operation of such processors in practice is often far from ideal, as instructions tend to depend upon one another and are also often not executed efficiently within the pipeline stages. In actual operation, instructions often require varying amounts of processor resources, creating interruptions ("bubbles" or "stalls") in the flow of instructions through the pipeline. Consequently, while superpipelining and superscalar techniques do increase throughput, the actual throughput of the processor ultimately depends upon the particular instructions processed during a given period of time and the particular implementation of the processor's architecture.

The speed at which a processor can perform a desired task is also a function of the number of instructions required to code the task. A processor may require one or many clock cycles to execute a particular instruction. Thus, in order to enhance the speed at which a processor can perform a desired task, both the number of instructions used to code the task as well as the number of clock cycles required to execute each instruction should be minimized. Statistically, certain instructions are executed more frequently than others are. If the design of a processor is optimized to rapidly process the instructions that occur most frequently, then the overall throughput of the processor can be increased. Unfortunately, the optimization of a processor for certain frequent instructions is usually obtained only at the expense of other less frequent instructions, or requires additional circuitry, which increases the size of the processor.

Many processors are called upon to accommodate numbers in two different formats: integer and floating point. Integers are whole numbers that contain no fractional parts and that may be represented in both positive and negative senses usually up to a limit of several multiples of the word length (extended precision) in the processor. Floating point numbers equate to scientific notation and may be used to represent any number. Bit positions in the floating point word accommodate sign, exponent and mantissa for the number. IEEE Floating Point Standards allow 1 bit for sign, 8 to 15 bits for exponent and 23 to 64 bits for mantissa respectively for formats ranging from single precision to double extended precision. Floating point units are specifically designed to process floating point numbers in order to gain throughput efficiencies over using a general purpose processor.

Current floating point units (FPUs), although much faster than general purpose processors, are not optimized all that much for throughput speed. There are often many exceptions in the processing of floating point numbers and many FPUs use microcode or software traps to accommodate these conditions which causes processing speed to decrease. Additionally, some recirculation of instructions or data may be necessary in some FPUs. That is, the contents of the FPU may have to make several passes through to accomplish its goal.

Floating point numbers are often represented in their denormal state which means that the decimal/binary point may be located anywhere in the number. The floating point number must usually be normalized in order to be processed in an FPU. Normalized representation requires that each floating point number start with a "1" just to the left of the "point" requiring a denormal number to be shifted and its exponent adjusted before further processing can occur. Increasing floating point processing demands created by explosive user interest in areas requiring more graphics, video and sound synthesis applications is driving the need for faster and better approaches to process floating point numbers at ever-increasing throughput speeds.

Therefore, what is needed in the art is a way to further increase floating point instruction processing predictability and speed without adding undue hardware complexity.

SUMMARY OF THE INVENTION

To address the above-discussed deficiencies of the prior art, it is a primary object of the present invention to provide a way of processing denormal numbers in an FPU without requiring the FPU to contain multiple normalization stages throughout.

In the attainment of the above primary object, the present invention provides an FPU for processing denormal numbers in floating point notation, a method of processing such numbers in an FPU and a computer system employing the FPU or the method. In one embodiment, the FPU includes: (1) a load unit that receives a denormal number having an exponent portion of a standard length from a source without the FPU and transforms the denormal number into a normalized number having an exponent portion of an expanded length greater than the standard length, (2) a floating point execution core, coupled to the load unit, that processes the normalized number at least once to yield a processed normalized number, the expanded length of the exponent portion allowing the processed normalized number to remain normal during processing thereof and (3) a store unit, coupled to the floating point execution core, that receives the processed normalized number and transforms the processed normalized number back into a denormal number having an exponent portion of the standard length.

The present invention therefore introduces the broad concept of operating in an expanded, nonstandard floating point notation within the FPU. Such notation allows denormal numbers to be transformed into normal numbers once when they are loaded into the FPU, processed as normal numbers without further normalization and transformed back into denormal form when stored from the FPU. This eliminates the need for multiple normalizations to be performed on the numbers as they are being processed in the FPU, thereby saving circuitry and processing time.

For purposes of the present invention, "exponent portion of a standard length" is defined as an exponent portion having a length dictated by an industry standard. The IEEE, for example, has promulgated industry standards for representing floating point numbers. The IEEE 754 standards specify lengths for both the exponent and fraction portions of such numbers.

In one embodiment of the present invention, the denormal number has a fraction portion of a standard length and the normalized number has a fraction portion of an expanded length greater than the standard length. Although not necessary for operation of the present invention, the normalized number may have an expanded fraction portion. In an embodiment to be illustrated and described, the fraction portion is 70 bits long.

In one embodiment of the present invention, the expanded length of the exponent portion is at least 16 bits. In an embodiment to be illustrated and described, the exponent portion is 17 bits long. A longer exponent portion guarantees that the normalized number will remain normal throughout its processing in the FPU.

In one embodiment of the present invention, the normalized number has an associated tag indicating that the normalized number is denormal. The structure and function of the tag will be set forth in detail in the description to follow. The denormal indication in the tag prompts the store unit to transform the processed normalized number back into a denormal number.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
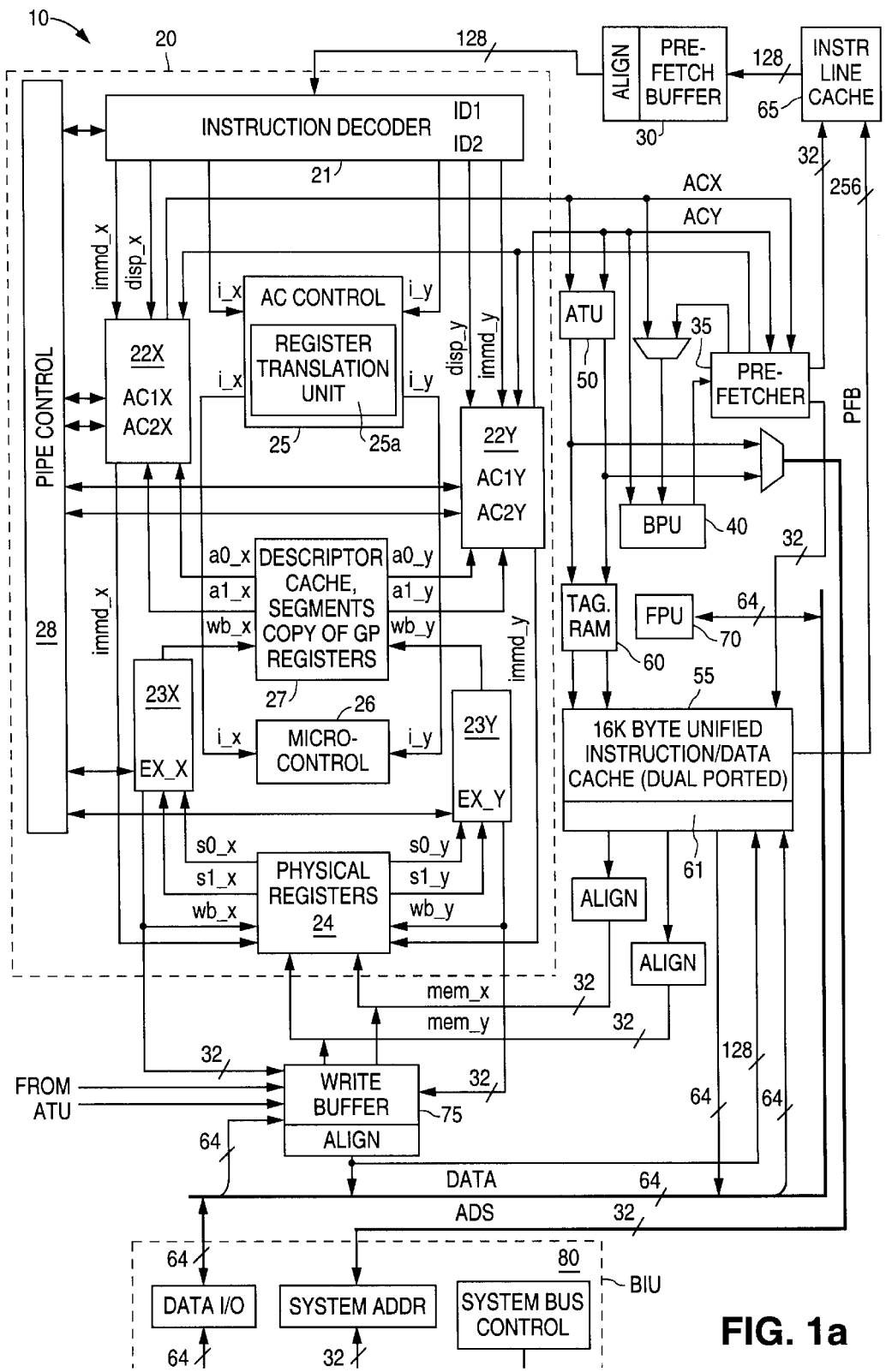
FIG. 1a illustrates a block diagram of an exemplary superscalar and superpipelined processor in accordance with the principles of the present invention.

Referring initially to FIG. 1a, illustrated is a block diagram of an exemplary superscalar and superpipelined processor 10 in accordance with the principles of the present invention. Exemplary processor 10 includes a processor core 20, a prefetch buffer 30, a prefetcher 35, a branch processing unit ("BPU") 40, an address translation unit ("ATU") 50, a unified cache 55, TAG random access memory ("TAG RAM") 60, an instruction line cache 65, an onboard floating point unit ("FPU") 70, a plurality of write buffers 75 (one shown), and a bus interface unit ("BIU") 80. Each of the above-identified components is conventional, i.e., their functionality is known. The functionality associated with the interrelationship of various ones of the components is also known. Exemplary processors implementing the foregoing are the 6x86 and MII processors available from Cyrix Corporation of Richardson, Tex.

In an exemplary embodiment, instruction line cache 65 and unified cache 55 operate as primary and secondary instruction caches, respectively, each having a 32 byte line size. This implementation reduces instruction fetches to unified cache 55. In a preferred embodiment, instruction line cache 65 may be a 256 byte cache, while unified cache 55 maybe a 16 kilobyte ("Kbyte") code/data cache. Unified cache 55 may also be associated with TAG RAM 60. In another exemplary embodiment, processor 10 may use a 32-bit address bus ("ADS"), a 64-bit data bus ("DATA") and a 256 bit pre-fetch bus ("PFB"). The PFB corresponds to the 32 byte line sizes of unified cache 55 and instruction line cache 65, and enables a full line of 32 instruction bytes to be transferred to instruction line cache 65 in a single clock cycle.

Unified cache 55 is preferably 4-way set associative, using a pseudo-least-recently-used ("LRU") replacement algorithm, with selectively alternative write-through and write-back modes. Unified cache 55 is multi-ported (through banking) to permit two memory accesses (e.g., data reads, instruction fetches or data writes) per clock cycle. Instruction line cache 65 is preferably a fully associative, look-aside implementation (relative to the unified cache 55), using an LRU replacement algorithm.

Turning momentarily to exemplary processor core 20, illustrated is a superscalar and superpipelined design having two exemplary execution pipelines, designated X and Y, and including an instruction decode ("ID") stage 21, two address calculation/operand access ("AC") stages, 22X and 22Y, two execution ("EX") stages, 23X and 23Y, and a register file 24 having 31 32-bit registers. Core 20 further includes an AC control stage 25, a microcontrol unit 26, a pipe control unit 28, and a second register file 27 containing a descriptor cache, segment registers and a copy of the logical general purpose registers.

Exemplary ID stage 21 is operative to decode a variable length x86-based instruction set, and may retrieve 16 bytes of instruction data from pre-fetch buffer 30 each clock cycle. Exemplary AC stages 22X and 22Y are each operative to perform address calculations for their respective execution pipelines. Exemplary EX stages 23X and 23Y are each operative to execute instructions within their respective execution pipelines. Exemplary register file 24 includes 31 physical registers. Exemplary AC control stage 25, which includes a register translation unit 25a, and may further include appropriately arranged register renaming hardware (not shown), is operative to control address calculations. Exemplary microcontrol unit 26, which may include a micro-sequencer (not shown) and a micro-ROM (not shown), provides execution control. Again, exemplary second register file 27 may include a descriptor cache, segment registers and a copy of the logical general purpose registers (i.e., as obtained from register file 24). Exemplary pipe control unit 28 is operative to control instruction flow through exemplary execution pipelines X and Y, whereby instruction order is maintained until pipe control unit 28 determines that a particular instruction will not cause an exception.

In an exemplary embodiment, register translation unit 25a has a capacity to map 32 physical registers to 8 logical registers. In the illustrated embodiment however, processor 10 includes only 31 physical registers, leaving register translation unit 25a with excess mapping capacity. Processor 10 may use the excess mapping capacity by allowing register translation unit 25a to map to a physical register other than those located in register file 24. In the illustrated embodiment, the physical register may be located in second register file 27, which is under control of AC control unit 25. In an alternate exemplary embodiment, pipe control unit 28 is further operative to remove bubbles from the instruction stream, i.e., "flushing" the execution pipelines behind branches that are mis-predicted and handling the execution of exception-causing instructions.

More particularly, BPU 40 monitors speculative execution associated with branches or floating point instructions (i.e., execution of instructions speculatively issued after branches that may be mis-predicted or floating point instructions issued to FPU 70 that may fault after execution of speculatively-issued instructions). In the event that a branch is mis-predicted (a condition not known until the instruction reaches one of the execution or write-back stages for the branch) or a floating point instruction faults, the execution pipeline is repaired to the point of the mis-predicted or faulting instruction (i.e., the execution pipeline is "flushed" behind the instruction) and an associated instruction fetch is restarted. Pipeline repair is preferably accomplished by creating processor state checkpoints at each pipeline stage as a predicted branch or floating point instruction enters the same. For these check pointed instructions, all processor resources (e.g., programmer-visible registers, the instruction pointer and the condition code register) that may be modified by succeeding speculatively-issued instructions are check pointed. If a check pointed branch is mis-predicted or a check pointed floating point instruction faults, the execution pipeline is flushed behind the check pointed instruction. In the case of floating point instructions, this typically results in the entire execution pipeline being flushed. However, for a mis-predicted branch, there may be a paired instruction in EX and two instructions in WB that are nonetheless allowed to complete.

In accordance with the illustrated embodiment, writes from processor core 20 may be queued into write buffer 75. Write buffer 75 provides an interface for writes to unified cache 55, while non-cacheable writes proceed directly from write buffer 75 to an external memory (shown and described in conjunction with FIG. 2). Write buffer logic may support optional read sourcing and write gathering. In an exemplary embodiment, write buffer 75 includes twelve 32-bit write buffers, and write buffer allocation is performed by AC control unit 25.

FPU 70 includes a load/store stage with 4-deep load and store queues, a conversion stage (32-bit to 80-bit extended format), and an execution stage. Loads are controlled by processor core 20, and cacheable stores are directed through write buffer 75 (i.e., write buffer 75 is preferably allocated for each floating point store operation).

Figure 1B:
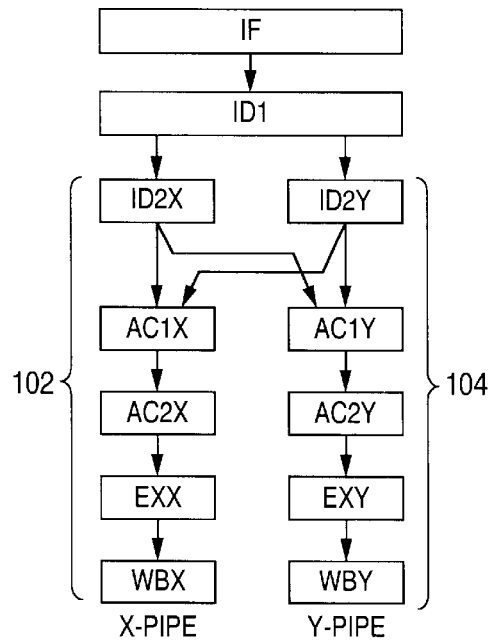
FIG. 1b illustrates a block diagram of seven exemplary pipelined stages of the processor of FIG. 1a, including X and Y execution pipelines.

Turning to FIG. 1b, illustrated is a block diagram of seven exemplary pipelined stages of processor 10 of FIG. 1a, including X and Y execution pipelines. As before, each of the X and Y execution pipelines includes IF, ID1, ID2, AC1, AC2, EX and WB stages. Exemplary IF stage provides a continuous instruction code stream into processor core 20. Prefetcher 35 is operative to fetch 16 bytes of instruction data into prefetch buffer 30 from either instruction line cache 65 or unified cache 55. BPU 40 is accessed with the prefetch address, and supplies target addresses to prefetcher 35 for predicted changes of flow, allowing prefetcher 35 to shift to a new code stream in a single clock cycle.

Exemplary decode stages ID1 and ID2 decode a variable length x86-based instruction set. Instruction decoder 21 retrieves 16 bytes of instruction data from prefetch buffer 30 each clock cycle. In ID1, the length of two instructions is decoded (one each for the X and Y execution pipelines) to obtain X and Y instruction pointers, a corresponding X and Y bytes-used signal is returned to prefetch buffer 30 which subsequently increments for the next 16 byte transfer. Also in ID1, certain instruction types are determined, such as changes of flow, and immediate or displacement operands are separated. In ID2, the decoding of X and Y instructions is completed, generating entry points for "microROM" and decoding addressing modes and register fields.

The optimum pipeline, X or Y, for executing an instruction is determined during the ID stages, causing the instruction to be issued into that pipeline. In an exemplary embodiment, circuitry is provided for pipeline switching which enables instructions to be switched from ID2X to AC1Y and from ID2Y to AC1X, as certain instructions (e.g., change of flow, floating point, exclusive or other like instructions) may only be issued in one of the two pipelines.

"Exclusive instructions," as the phrase is used herein, include any instructions that may fault within the EX pipeline stage, as well as certain instruction types, such as protected mode segment loads, string, special register access (control, debug, test, etc.), Multiply/Divide, Input/Output, PUSHA/POPA (PUSH all/POP all), task switch and the like. Exclusive instructions may use the resources of both execution pipelines; exclusive instructions are preferably issued alone from the ID stage.

Exemplary address calculation stages AC1 and AC2 calculate addresses for memory references and supply memory operands. During AC1 two 32 bit linear (three operand) addresses are preferably calculated per clock cycle. Data dependencies are checked and resolved using register translation unit 25a and the 31 physical registers in register file 24 are advantageously used to map eight general purpose, programmer-visible logical registers in accordance with x86-based architecture, namely: EAX, EBX, ECX, EDX, EDI, ESI, EBP and ESP. During AC2, register file 24 and unified cache 55 are accessed with the physical address. For cache hits, cache access time for multi-ported, unified cache 55 is the same as that of a register, effectively extending the register set. The physical address is either the linear address, or if address translation is enabled, a translated address generated by ATU 50.

The AC stage preferably includes eight logical, or architectural, registers, representing the x86-based register set. In a preferred embodiment, the logical register corresponding to the stackpointer ("ESP") contains the actual stackpointer (instead of simply a copy thereof) when control of the stackpointer is allocated to AC1. If an instruction requires one or more address calculations, AC1 is operative to wait until the required data of the logical registers are valid before accessing those registers. During AC2, operands are obtained by accessing register file 24 and unified cache 55 with the physical address. The physical address therefore is preferably either the linear address or, if address translation is enabled, a translated address generated by ATU 50.

Exemplary ATU 50 is operative to generate translated addresses, preferably using a translation lookaside buffer ("TLB") or the like, from the linear address using information from page tables in memory and local workspace control registers. Unified cache 55 is virtually indexed and physically tagged to permit, when address translation is enabled, set selection with the untranslated address (available at the end of AC1) and, for each set, tag comparison with the translated address from ATU 50 (available early in AC2). In the illustrated embodiment, segmentation or address translation violation checks are performed in AC2.

Instructions within a given instruction code stream are preferably kept in order until it is determined that out-of-order execution of the same will not cause an exception. This determination may be made during or before AC2, although floating point and certain exclusive instructions may cause exceptions during execution. Instructions are passed from AC2 to EX (floating point instructions are passed to FPU 70). Instructions spend a variable number of clock cycles in EX as many of the same may execute out of order. Integer instructions may cause exceptions in EX and are therefore designated as exclusive and issued alone into both execution pipelines, thereby ensuring that exceptions are handled in order.

Exemplary execution stages EX X and EX Y perform the operations defined by a given instruction using one or more adders, multiplexers, shifters, or other functional units. The EX X execution stage may also include multiplication and division hardware.

Exemplary write back stage ("WB") updates register file 24, condition codes, as well as other parts of an associated processing system with the results of the previously executed instruction. Typically, register file 24 is written in phase 1 ("PH1") of WB and read in phase 2 ("PH2") of AC2.

Additional disclosure of write buffers 75, speculative execution and the microsequencer may be found in U.S. Pat. No. 5,584,009 entitled "System And Method Of Retiring Store Data From A Write Buffer"; U.S. Pat. No. 5,835,967 entitled "Adjusting Prefetch Size Based On Source Of Prefetch Address"; and U.S. Pat. No. 5,644,741 entitled "Processor With Single Clock Decode Architecture Employing Single MicroROM", all of which are commonly assigned to the Assignee of the present invention and are herein incorporated by reference.

Figure 2:
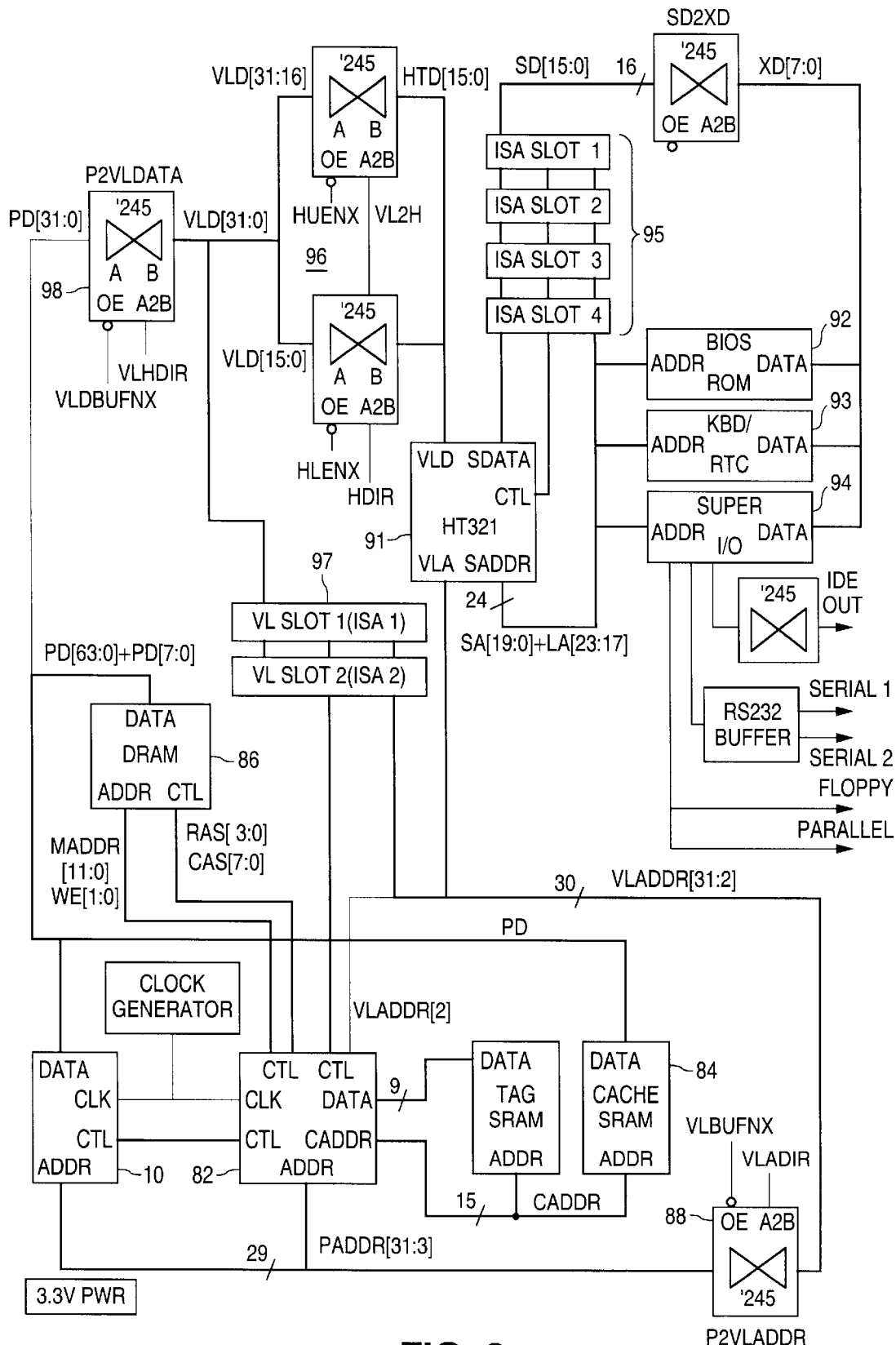
FIG. 2 illustrates a block diagram of an exemplary processor system incorporating the processor of FIGS. 1a and 1b.

Turning to FIG. 2, illustrated is an exemplary processor system design, in the form of a motherboard, that advantageously employs exemplary processor 10 of FIGS. 1a and 1b in cooperation with a single chip memory/bus controller 82. Controller 82 provides an interface between processor 10 and an external memory subsystem controlling data movement over the 64-bit processor data bus. The external memory subsystem includes level two cache 84 and main memory 86. In accordance with the illustrated embodiment, the data path may be external to controller 82 thereby reducing its pin count and cost.

Controller 82 preferably interfaces with ADS, the 32-bit address bus, directly and includes a one bit wide data port (not shown) for reading and writing registers within controller 82. A bidirectional isolation buffer 88 is preferably provided as an address interface between processor 10 and a conventional video local bus ("VL-Bus") and a conventional industry standard architecture ("ISA") bus. Controller 82 provides control for VL-Bus and ISA bus interfaces. A VL/ISA interface chip 91 provides standard interfaces to an exemplary 32-bit VL-Bus and an exemplary 16-bit ISA bus. The ISA bus may interface to a basic input/output system ("BIOS") 92, a keyboard controller 93, and an I/O chip 94, as well as standard ISA slots 95. The interface chip 91 preferably interfaces to the 32-bit VL-bus through a bidirectional 32/16 multiplexer 96 formed by multiple high/low word isolation buffers. The VL-Bus interfaces to standard VL-Bus slots 97 and, through a bidirectional isolation buffer 98, to the low double word of PD.

Figure 3:
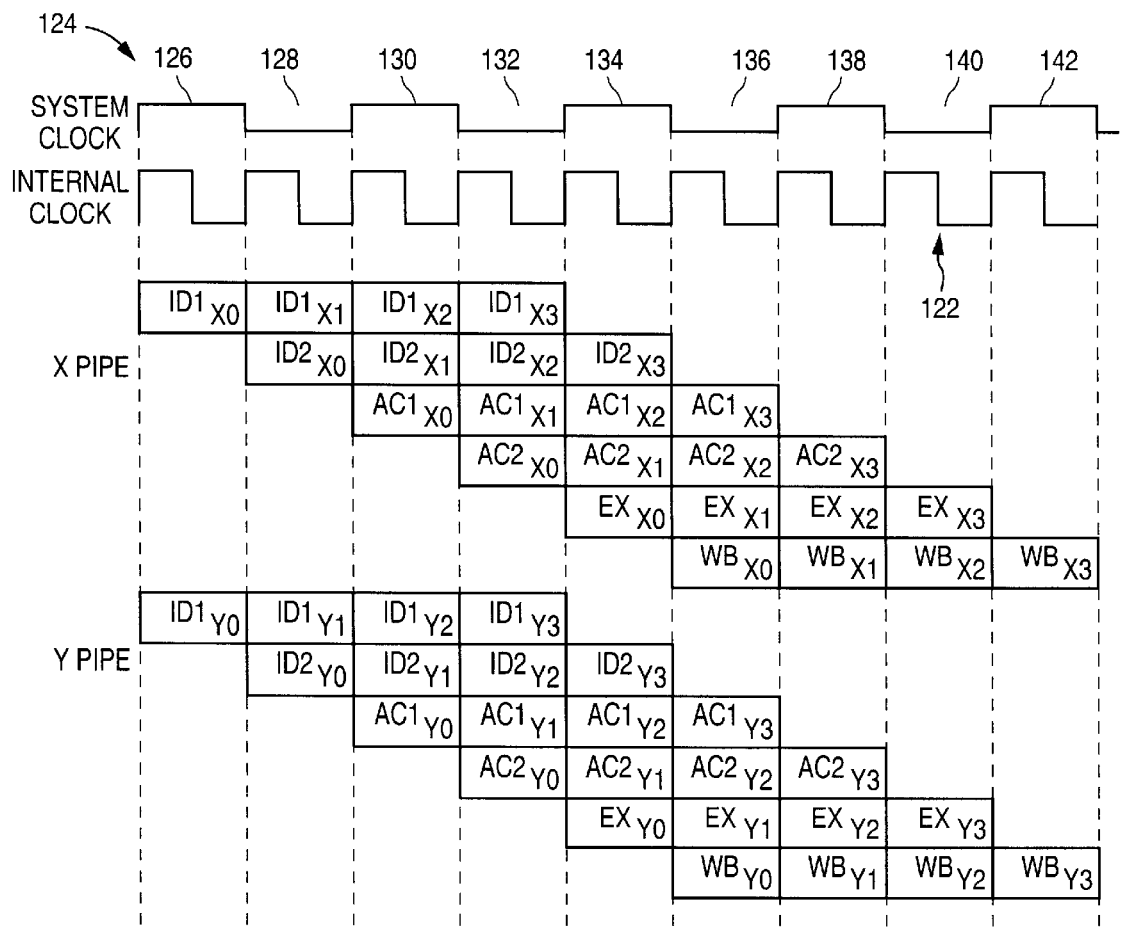
FIG. 3 illustrates an exemplary timing diagram demonstrating the flow of instructions through a pipeline in accordance with the exemplary processor of FIGS. 1a through 2.

Turning to FIG. 3, illustrated is an exemplary timing diagram demonstrating the flow of instructions through a pipeline of processor 10 of FIGS. 1a and 2. The timing diagram illustrates the flow of eight instructions through the pipeline, showing overlapping execution of instructions for a two pipeline architecture. Processor 10 preferably uses an internal clock 122 that is a multiple of a system clock 124. In the illustrated embodiment, internal clock 122 operates at twice the frequency of system clock 124.

During a first internal clock cycle 126, the ID1 stage operates respectively on instructions X0 and Y0. During internal clock cycle 128, instructions X0 and Y0 are in the ID2 stage (X0 being in ID2X and Y0 being in ID2Y) and instructions X1 and Y1 are in the ID1 stage. During internal clock cycle 130, instructions X2 and Y2 are in the ID1 stage, instructions X1 and Y1 are in the ID2 stage (X1 being in ID2X and Y1 being in ID2Y) and instructions X0 and Y0 are in the AC1 stage (X0 being in AC1X and Y0 being in AC1Y). During internal clock cycle 132, instructions X3 and Y3 are in the ID1 stage, instructions X2 and Y are in the ID2 stage, instructions X1 and Y1 are in the AC1 stage and instructions X0 and Y0 are in the AC2 stage.

The execution portion of each of the foregoing instructions is performed during sequential clock cycles, namely, clock cycles 134 to 140. This is an important aspect a pipelined architecture as the total instructions completed per clock cycle increases without reducing the execution time of individual instructions. Greater instruction throughput is thereby achieved without requiring greater demands on the speed of the hardware.

It should be noted that FIG. 3 illustrates an optimum condition, as no stage requires more than a single clock cycle. In actuality, however, one or more stages may require additional clock cycles for completion, thereby changing instruction flow through the other pipeline stages. Further, instruction flow through one pipeline may depend upon the flow of other instructions in the same or the other pipeline.

Figures 4, 5, 6:
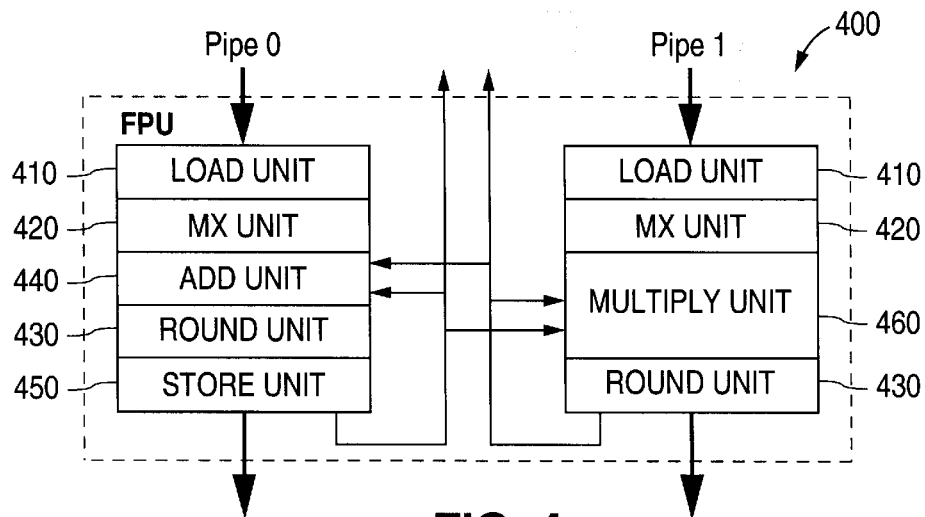
FIG. 4 illustrates a block diagram of a pipelined FPU.
FIG. 5 illustrates IEEE standard floating point formats for number representation.
FIG. 6 illustrates an internal floating point format embodiment which may be used within an FPU.

Turning now to FIG. 4, illustrated is a block diagram of a pipelined FPU 400 comprising two pipes, Pipe0 and Pipe1, each having load unit 410, multi-media extensions ("MX") unit 420, and round unit 430. Pipe0 further includes an add unit 440 and a store unit 450, and Pipe1 further includes a multiply unit 460. The focus of the present invention is directed to optimizing the operation of FPU 70 in the accommodation of floating point numbers. In the embodiment illustrated, the FPU 400 is designed to be asymmetric superscalar, which allows for maximum throughput without excessive duplication of execution resources. A floating point execution core comprises the MX units 420, the round units 430, the add unit 440, and the multiply unit 460 in this embodiment. Although the exemplary architecture of FPU 400 may be adapted to employ the principles of the present invention, the present invention is not limited to a specific FPU architecture.

Denormal numbers in floating point arithmetic pose a problem of normalization when certain operations are performed with these numbers as operands. Examples of such operations include multiplication, division and square-root. Processors usually slow down in cases of denormal operands and use software traps to normalize these numbers before performing the actual operation. Observation reveals that certain floating point operations on normal numbers can generate denormal results thereby slowing down further operations which use the denormal result.

A technique of normalizing denormal operands by keeping the internal precision larger than the machine precision has been identified. The denormal numbers are normalized when converted from memory and are stored internally in FPU 400 in normalized form. The load unit 410 (which is further described below) receives a denormal number having a standard length exponent and may transform this denormal number into an expanded length exponent normalized number. A denormal number having a standard length fractional portion may also be transformed into a normalized number having an expanded length fractional portion. The floating point execution core processes the normalized number to yield a processed normalized number with expanded exponent length allowing the number to remain normal. Also, operations on such pseudo-normalized numbers guarantee that the final resulting fraction is always normalized such that the denormalized information is stored in the exponent part of the number. The store operations that convert the numbers into memory format then operate on the pseudo-normal numbers resulting in a denormalization step. The store unit 450 receives this expanded, processed normalized number with extended exponent from the floating point execution core and transforms the number onto a standard exponent length denormal number as required.

Keeping the denormal numbers normalized internally in FPU 400 increases processing speed of the denormal numbers. Arithmetic operations do not have to keep track of special conditions dealing with denormal numbers. Special hardware is required to denormalize the pseudo-normalized numbers but only for store operations when the data is being written into external memory. As long as the number exists in the internal form, no further normalization is required on these numbers before internal arithmetic operations are performed. The penalty of extra hardware and latency is paid not by the actual arithmetic operation but by the load/store operations which occur infrequently compared to the actual arithmetic operations.

Turning now to FIG. 5, illustrated are IEEE standard floating point formats for number representation showing a) single precision, b) single extended precision, c) double precision, and d) double extended precision. Each of these standard formats uses a single bit for sign, a field of bits shown to represent exponent and a concluding field of bits shown to represent the binary digit fraction or mantissa part of the floating point number. With IEEE denormals, the result of add, multiply or divide may have to be shifted depending on the exponent created. There may also be a shift required at the input to each of these functions as well. These shifts would normally require a full width shifter to shift the result to the proper alignment. The IEEE standard floating point formats are supported as memory operands external to FPU 400.

Turning now to FIG. 6, illustrated is an internal floating point format embodiment which may be used within a floating point unit such as FPU 400. This embodiment uses a single bit for sign, a field of 17 bits shown to represent exponent, a field of 70 bits shown to represent the binary digit fraction or mantissa part of the floating point number and a field of 5 bits shown to represent what is called a "Tag". The internal format is similar to the IEEE standard floating point format. However, the differences lie in the expanded bits of the exponent and mantissa and that a special field has been added for the Tag for each number. When working internally, the FPU 400 converts the external number to this internal format and subsequent computations within FPU 400 are done in this format. In the internal format, all values are represented as normalized values, as previously stated, and therefore no shifting is required.

The Tag word indicates what kind of operand is being represented by the format. The Tag word allows the number to be easily identified (as to denormal, pseudo-denormal, etc.) without the complete exponent and mantissa having to be inspected. Without the Tag word, determination of other special conditions and results may also have to be concluded by examination of the exponent and mantissa. A primary motivation of the Tag in this embodiment is to associate that an internal normalized number is externally denormal.

Figure 7A:
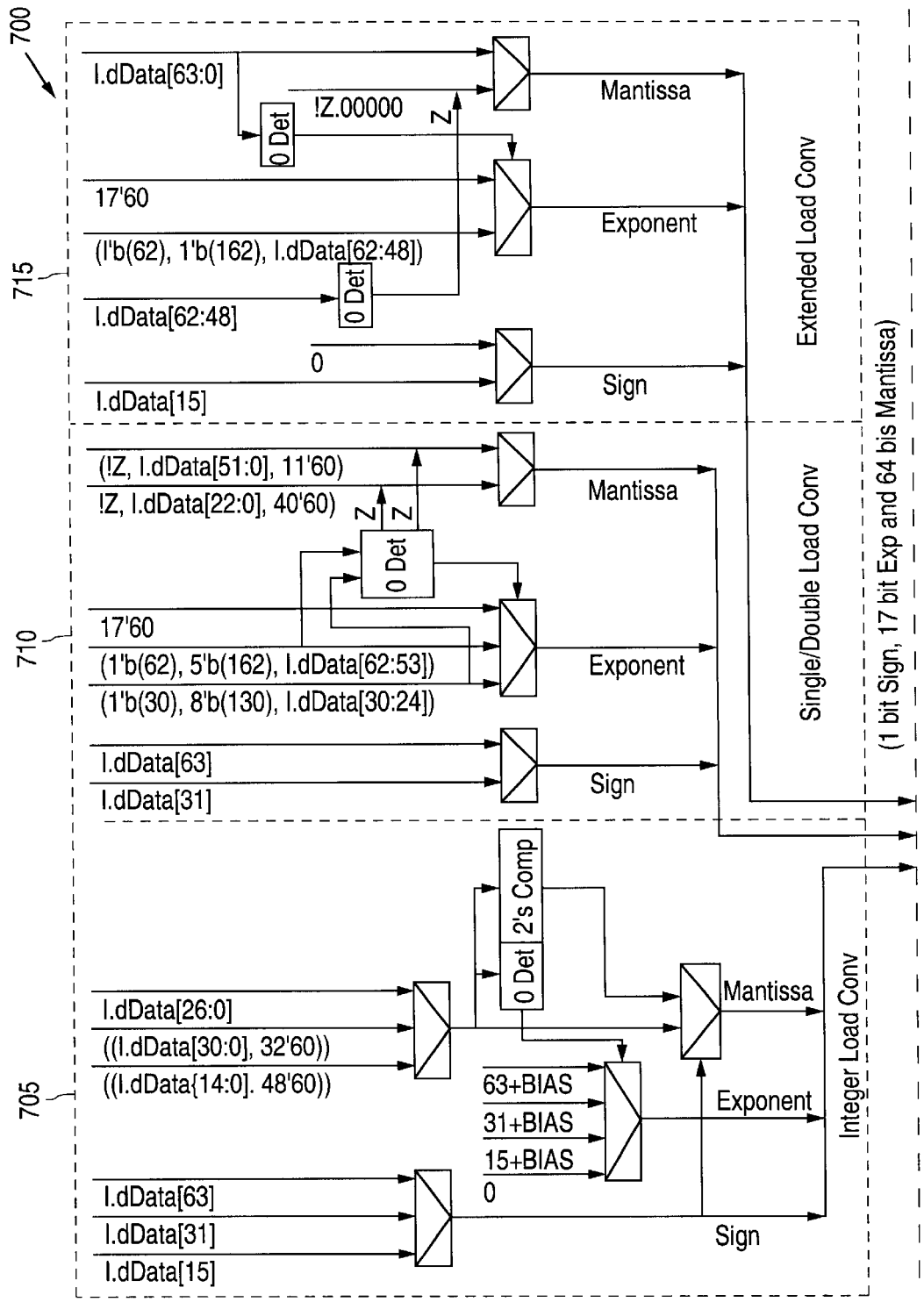
FIGS. 7A and 7B illustrate a block diagram of and exemplary load converter and normalizer unit that accepts different input number formats and produces normalized floating point numbers in the internal floating point format of FIG. 6.
Figure 7B:
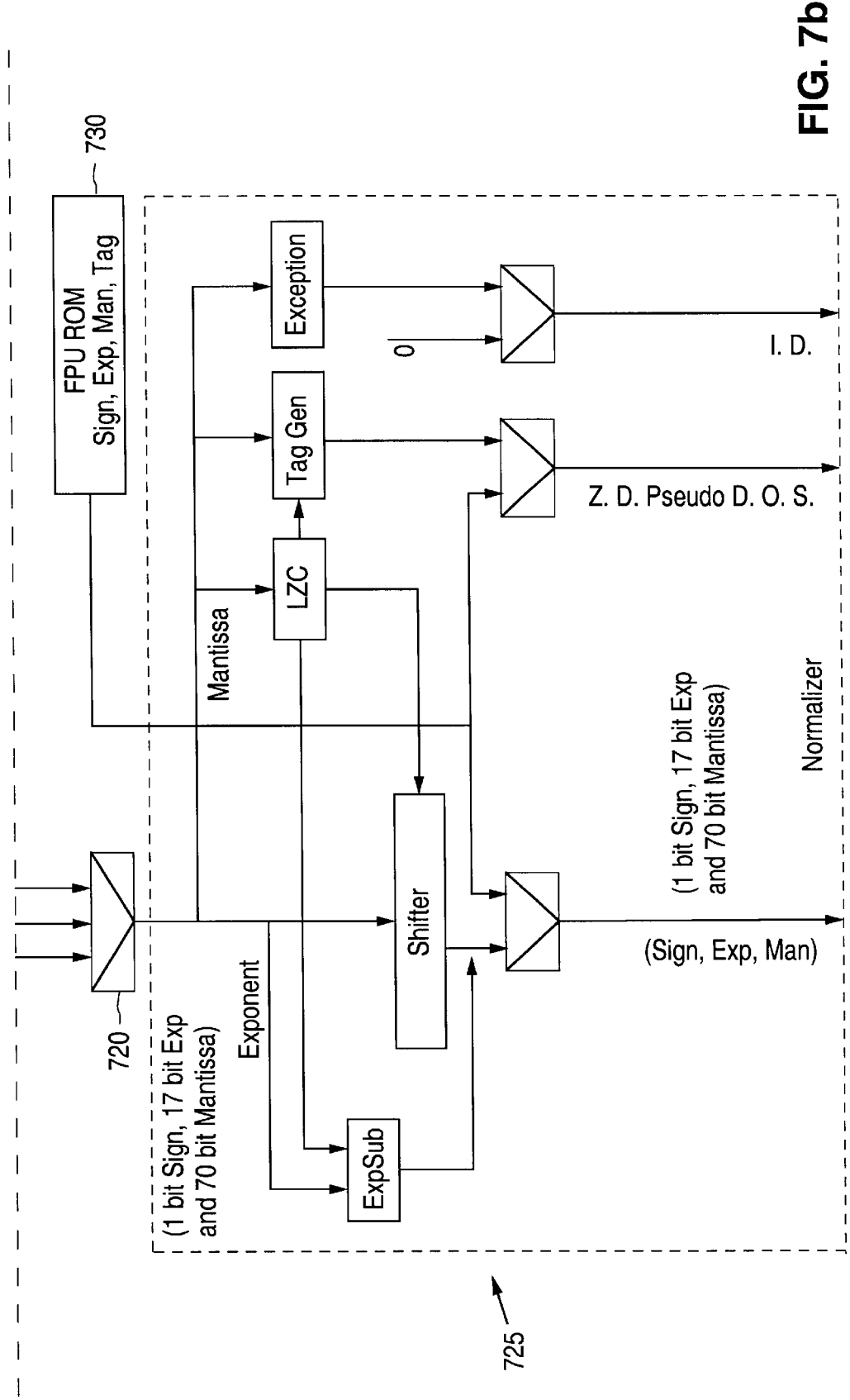

Turning now to FIG. 7, illustrated is a block diagram of a load converter and normalizer unit, generally designated 700, that accepts different input number formats and produces normalized floating point numbers, tags and exception information in the internal floating point format of FIG. 6. The load converter and normalizer unit 700 is capable of accepting three different input number formats for loading into an FPU. These formats include integer, single or double precision and extended precision numbers, with each having separate data paths 705, 710, 715, respectively. Each of the data paths 705, 710, 715 provides conventional circuitry for biasing exponents bias and aligning mantissas. In addition to biasing and alignment, the integer data path 705 provides integer to floating point format conversion. The data paths 705, 710, 715 flow into a selector 720 that then selects one of the products of the data paths 705, 710, 715 and directs it into a normalizer unit 725.

The exponent and mantissa portions of the floating number are separated in the normalizer unit 725. For a mantissa, a leading zero count (LZC) is ascertained for the number as are the existence of a tag and an exception (according to IEEE floating point standards). The LZC is used both to direct a shifter circuit that allows elimination of the leading mantissa zeros and to adjust the exponent in concert with the mantissa shifting. An FPU ROM 730 provides for the handling of special cases. The three outputs from the normalizer units 725 include sign, exponent and mantissa portions, tag information and exception information.

Figure 8:
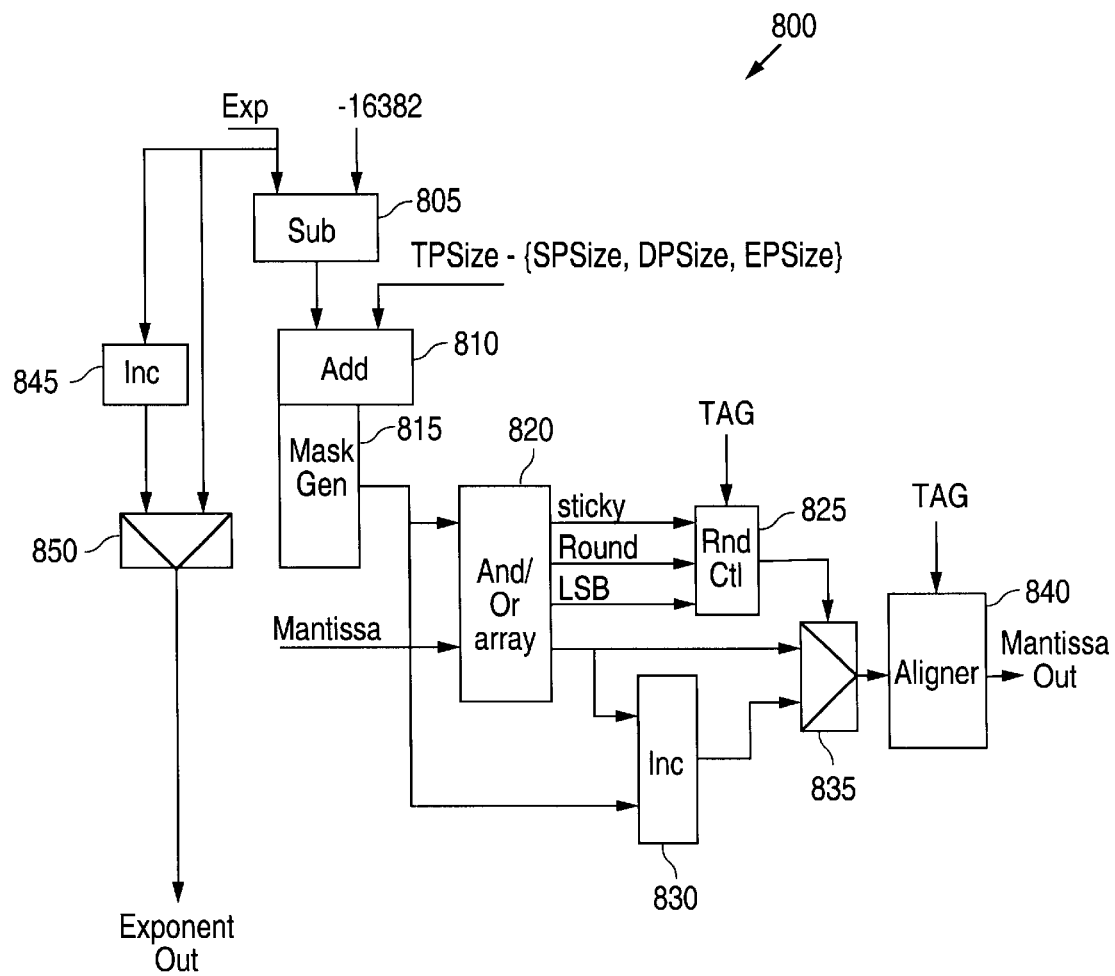
FIG. 8 illustrates a block diagram of a floating point number denormalizer that accepts numbers represented in the internal floating point format of FIG. 6.

Turning now to FIG. 8, illustrated is a block diagram of a floating point number denormalizer, generally designated 800. The floating point number denormalizer 800 denormalizes a floating point number for storage after it has been processed in an FPU constructed according to the present invention. A bias number (−16382) is subtracted from the exponent of the floating point number in a subtractor 805. The exponent is further adjusted to reflect the original number format (single, double or extended precision) in an adder 810.

The structure and function of a mask generator 815 and an and/or array 820 illustrated in FIG. 8 are described in detail in co-pending U.S. patent application Ser. No. 0x/xxx,xxx (Attorney's Docket No. P04080) entitled "Rounding Denormalized Numbers In A Pipelined Floating Point Unit Without Pipeline Stalls", commonly assigned and contemporaneously filed with the present invention and herein incorporated by reference. A selector 835 assembles outputs from the and/or array 820, an incrementer 830 and a conventional IEEE rounding control 825 and delivers the outputs to an aligner 840, which produces a mantissa, as shown. An exponent is delivered through a shifter 850 and an incrementer 845, yielding both of the required components for a floating point number.

From the above, it is apparent that the present invention provides a capability to enhance the throughput speed of floating point processing units by keeping the denormal numbers normalized internally thereby increasing the processing speed of denormal numbers.

Although the present invention and its advantages have been described in detail, those skilled in the art should understand that they can make various changes, substitutions and alterations herein without departing from the spirit and scope of the invention in its broadest form.

What is claimed is:

1. A floating point unit (FPU) operable to process denormal numbers in floating point notation, comprising:

a load unit that receives a denormal number having an exponent portion of a standard length from a source without the FPU and transforms the denormal number into a normalized number having an exponent portion of an expanded length greater than the standard length, the normalized number having an associated tail that indicates whether the normalized number is associated with a denormal number;

a floating point execution core, coupled to the load unit, that processes the normalized number at least once to yield a processed normalized number, the expanded length of the exponent portion allowing the processed normalized number to remain normal during processing thereof; and a store unit, coupled to the floating point execution core, that receives the processed normalized number and transforms the processed normalized number back into a denormal number having an exponent portion of the standard length.

2. The FPU as recited in claim 1 wherein the denormal number has a fraction portion of a standard length and the normalized number has a fraction portion of an expanded length greater than the standard length.

3. The FPU as recited in claim 1 wherein the expanded length of the exponent portion is at least 16 bits.

4. The FPU as recited in claim 1 wherein the tag comprises five bits.

5. A floating point unit (FPU) for processing denormal numbers in floating point notation, comprising:

load means for receiving a denormal number having an exponent portion of a standard length from a source without the FPU and transforming the denormal number into a normalized number having an exponent portion of an expanded length greater than the standard length, the normalized number having an associated tag that indicates whether the normalized number is associated with a denormal number;

floating point execution means, coupled to the load means, for processing the normalized number at least once to yield a processed normalized number, the expanded length of the exponent portion allowing the processed normalized number to remain normal during processing thereof; and store means, coupled to the floating point execution means, for receiving the processed normalized number and transforming the processed normalized number back into a denormal number having an exponent portion of the standard length.

6. The FPU as recited in claim 5 wherein the denormal number has a fraction portion of a standard length and the normalized number has a fraction portion of an expanded length greater than the standard length.

7. The FPU as recited in claim 5 wherein the expanded length of the exponent portion is at least 16 bits.

8. The FPU as recited in claim 5 wherein the tag comprises five bits.

9. A method of processing denormal numbers in floating point notation in a floating point unit (FPU), comprising the steps of:

receiving a denormal number having an exponent portion of a standard length from a source without the FPU into a load unit;

transforming the denormal number into a normalized number having an exponent portion of an expanded length greater than the standard length in the load unit;

generating a tag associated with the normalized number that indicates whether the normalized number is associated with a denormal number;

processing the normalized number at least once to yield a processed normalized number, the expanded length of the exponent portion allowing the processed normalized number to remain normal during processing thereof;

receiving the processed normalized number into a store unit; and transforming, in the store unit, the processed normalized number back into a denormal number having an exponent portion of the standard length.

10. The method as recited in claim 9 wherein the denormal number has a fraction portion of a standard length and the normalized number has a fraction portion of an expanded length greater than the standard length.

11. The method as recited in claim 9 wherein the expanded length of the exponent portion is at least 16 bits.

12. The method as recited in claim 9 wherein the tag comprises five bits.

13. A computer system, comprising:

(a) a processor having an integer execution core containing at least one execution pipeline for executing integer instructions and a floating point unit (FPU) for executing floating point instructions and capable of processing denormal numbers in floating point notation, the processor capable of addressing segments of system memory coupled thereto;

(b) system memory for storing integer and floating point instructions including instructions for accessing the system memory;

(c) the processor including instruction fetch logic that fetches integer and floating point instructions from the system memory; and (d) the FPU further including: (i) a load unit that receives a denormal number having an exponent portion of a standard length from a source without the FPU and transforms the denormal number into a normalized number having an exponent portion of an expanded length greater than the standard length, the normalized number having an associated tag that indicates whether the normalized number is associated with a denormal number, (ii) a floating point execution core, coupled to the load unit, that processes the normalized number at least once to yield a processed normalized number, the expanded length of the exponent portion allowing the processed normalized number to remain normal during processing thereof, and (iii) a store unit, coupled to the floating point execution core, that receives the processed normalized number and transforms the processed normalized number back into a denormal number having an exponent portion of the standard length.

14. The computer system as recited in claim 13 wherein the denormal number has a fraction portion of a standard length and the normalized number has a fraction portion of an expanded length greater than the standard length.

15. The computer system as recited in claim 13 wherein the expanded length of the exponent portion is at least 16 bits.

16. The computer system as recited in claim 13 wherein the tag comprises five bits.

17. A method of operating a computer system, comprising the steps of:

(a) applying power to a processor having an integer execution core containing at least one execution pipeline for executing integer instructions and a floating point unit (FPU) for executing floating point instructions and capable of processing denormal numbers in floating point notation, the processor capable of addressing segments of system memory coupled thereto;

(b) storing integer and floating point instructions in a system memory, the instructions including instructions for accessing the system memory;

(c) fetching integer and floating point instructions from the system memory; and (d) executing instructions in the processor, the FPU further including: (i) a load unit that receives a denormal number having an exponent portion of a standard length from a source without the FPU and transforms the denormal number into a normalized number having an exponent portion of an expanded length greater than the standard length, the normalized number having an associated tag that indicates whether the normalized number is associated with a denormal number, (ii) a floating point execution core, coupled to the load unit, that processes the normalized number at least once to yield a processed normalized number, the expanded length of the exponent portion allowing the processed normalized number to remain normal during processing thereof, and (iii) a store unit, coupled to the floating point execution core, that receives the processed normalized number and transforms the processed normalized number back into a denormal number having an exponent portion of the standard length.

18. The method as recited in claim 17 wherein the denormal number has a fraction portion of a standard length and the normalized number has a fraction portion of an expanded length greater than the standard length.

19. The method as recited in claim 17 wherein the expanded length of the exponent portion is at least 16 bits.

20. The method as recited in claim 17 wherein the tag comprises five bits.

21. A floating point unit (FPU), comprising:

two pipelines operable to execute floating point instructions;

each of the pipelines comprising:
- a load unit operable to receive two denormalized numbers from a source without the FPU, each denormal number having an exponent portion of a standard length, the load unit also operable to transform the two denormal numbers into two normalized numbers each having an exponent portion of an expanded length greater than the standard length, the normalized number having an associated tag that indicates whether the normalized number is associated with a denormal number;
- a floating point execution core comprising one of an add unit and a multiply unit, the add unit operable to add the two normalized numbers, the multiply unit operable to multiply the two normalized numbers, the floating point execution core operable to generate a processed normalized number, the expanded length of the exponent portion of each normalized number allowing the processed normalized number to remain normal; and
- a round unit operable to round the processed normalized number; and
- the pipeline comprising the add unit further comprising a store unit operable to transform the processed normalized number back into a denormal number having an exponent portion of the standard length.

* * * * *

UNITED STATES PATENT AND TRADEMARK OFFICE
CERTIFICATE OF CORRECTION

| | |
|---|---|
| PATENT NO. | : 6,801,924 B1 |
| APPLICATION NO. | : 09/377140 |
| DATED | : October 5, 2004 |
| INVENTOR(S) | : Daniel W. Green, Atul Dhablania and Jeffrey A. Lohman |

Page 1 of 1

It is certified that error appears in the above-identified patent and that said Letters Patent is hereby corrected as shown below:

Column 12, line 3 and 4, delete "Ser. No. 0x/xxx,xxx (Attorney's Docket No. P04080)" and replace with -- Ser. No. 09/377,683 --;

Column 12, claim 1, line 35, after "number" insert -- ,the tag separate from the exponent portion of the normalized number --;

Column 12, claim 5, line 65, after "number" insert -- ,the tag separate from the exponent portion of the normalized number --;

Column 13, claim 9, line 30, after "number" insert -- ,the tag separate from the exponent portion of the normalized number --;

Column 14, claim 13, line 5, after "number" insert -- the tag separate from the exponent portion of the normalized number --;

Column 14, claim 17, line 46, after "number" insert -- the tag separate from the exponent portion of the normalized number --;

Column 15, claim 21, line 11, after "number" insert -- ,the tag separate from the exponent portion of the normalized number --.

Signed and Sealed this

Twenty-fourth Day of October, 2006

JON W. DUDAS
*Director of the United States Patent and Trademark Office*